C. H. GIVENS.
VEHICLE WHEEL SUPPORT.
APPLICATION FILED SEPT. 8, 1909.
955,790.
Patented Apr. 19, 1910.
2 SHEETS—SHEET 2.
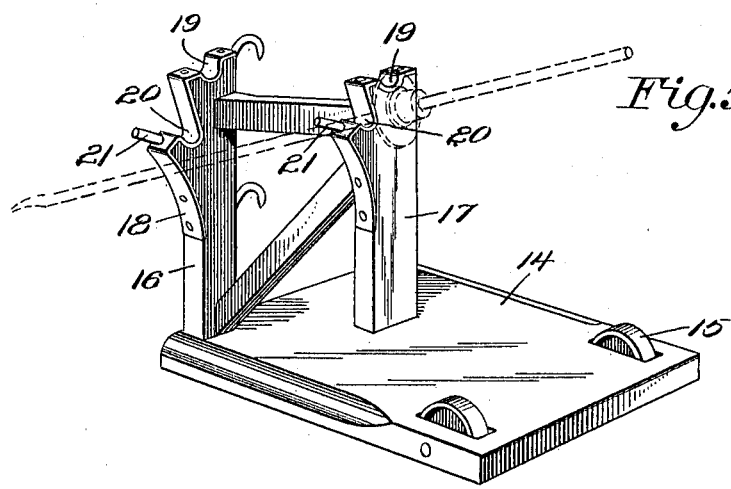
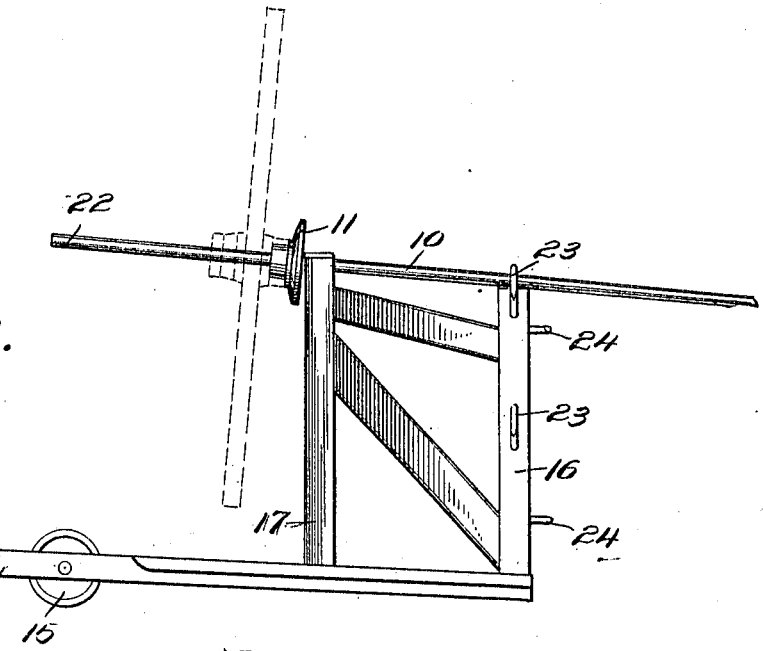
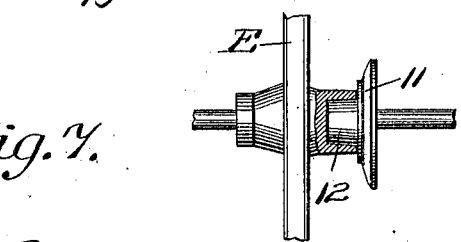
Witnesses
Inventor
Charles H. Givens
By Victor J. Evans
Attorney

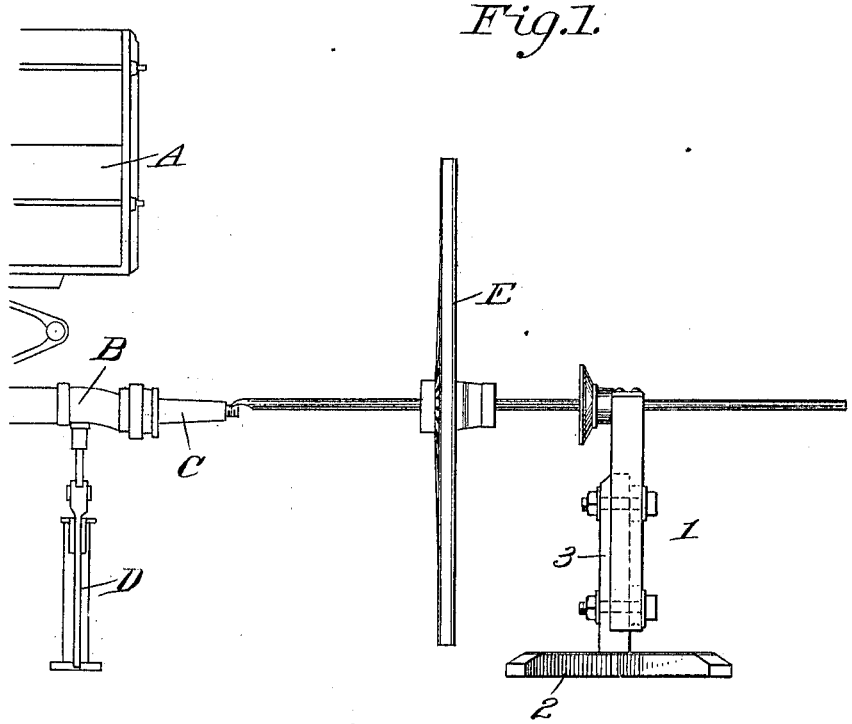
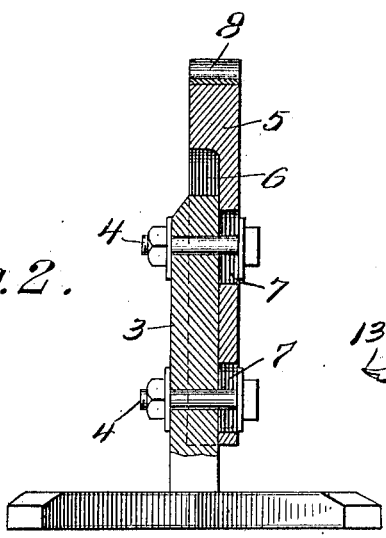
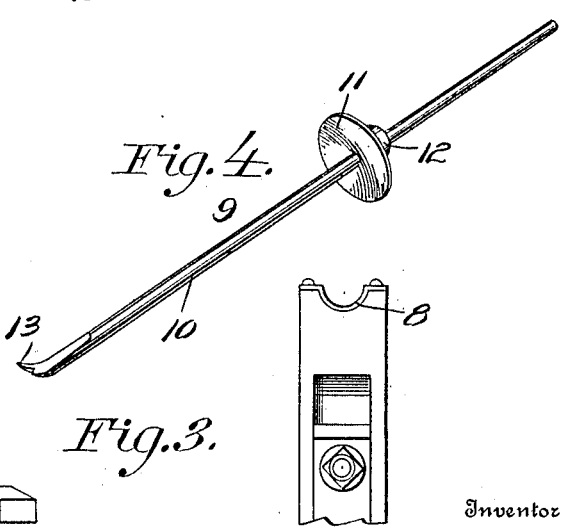

UNITED STATES PATENT OFFICE.

CHARLES H. GIVENS, OF WAWONA, CALIFORNIA.

VEHICLE-WHEEL SUPPORT.

955,790.  Specification of Letters Patent.  Patented Apr. 19, 1910.

Application filed September 8, 1909. Serial No. 516,647.

*To all whom it may concern:*

Be it known that I, CHARLES H. GIVENS, a citizen of the United States, residing at Wawona, in the county of Mariposa and State of California, have invented new and useful Improvements in Vehicle-Wheel Supports, of which the following is a specification.

This invention relates to vehicle wheel supports, and has for an object to provide a device of this character that can be used in connection with a well known form of jack and positioned with respect to the axle of the vehicle so that the wheel can be removed from its axle and transferred to my improved support where it may be cleaned, repaired or lubricated.

A still further object of my invention resides in the novel and efficient manner whereby the wheel can be removed from the axle while lubricating the latter, the said wheel when in its removed position being disposed in line with the axle so that it can be conveniently restored thereon.

The above mentioned and other objects are attained by the construction, combinations and arrangements of parts, as disclosed on the drawings, set forth in this specification, and particularly pointed out in the appended claims.

In the drawings, forming a portion of this specification and in which like characters of reference indicate similar parts in the several views: Figure 1 is an end view of a portion of a wagon showing my improved support in its applied position. Fig. 2 is a vertical section through the jack. Fig. 3 is a detail side elevation of a portion of the jack. Fig. 4 is a detail perspective view of the suspending member. Fig. 5 is a perspective view of the trestle. Fig. 6 is a side elevation of the same. Fig. 7 is a detail view showing the manner of engaging the hub portion of a vehicle with a coöperating part of the suspending member.

My improved support in the primary action of removing a wheel from its axle is first placed in line with the latter as shown in Fig. 1. For convenience a portion of a vehicle is illustrated at A in Fig. 1. The vehicle is provided with an axle B from which extends the usual well known form of spindle C. A hoisting member D is engaged with the axle and is adapted to move the latter upwardly so that the wheel upon the axle can be raised sufficiently from above the ground. After the axle has been thus positioned, my jack as shown at 1 is placed in line with the spindle C and is suitably spaced therefrom. The jack comprises a supporting base 2 from which arises a standard 3 which carries a plurality of clamping bolts 4. An adjustable member 5 is mounted upon the standard and is grooved vertically as shown at 6 for the reception of a portion of the standard, as shown. The member 5 has formed therein vertically disposed elongated slots 7 through which portions of the clamping bolts are passed. The construction of the jack is such that the member 5 can be adjusted vertically to agree with a corresponding adjustment of the hoisting member D. The member 5 is provided at its upper end with a socket or bearing plate 8. A suspending member is illustrated at 9 and consists preferably of a metallic shank 10 which is cylindrical cross sectionally and is provided intermediate of its ends with a stop collar 11 of concavo-convex form. This stop collar has formed integrally therewith a boss or bearing 12, and as shown this boss extends from the convex side of the collar. The outer end of the member 9 is flattened slightly and is curved downwardly as shown to form a depending tooth 13 which is adapted to engage the threaded ends of the spindles C. By constructing the outer extremity of the suspending member 9 in the manner above described it will be appreciated that when the said member is in the position shown in Fig. 1 its toothed portion 13 bearing against the threaded end of the spindle will not strip the said ends of its threads nor will it otherwise mutilate them. After the suspending member has been engaged at one of its ends with the threaded extremity of the spindle, the portion of the member adjacent to the collar 11 can be placed in the socket or bearing plate 8. In this manner the member 9 can be effectively supported in a horizontal position and is adapted to support the vehicle wheel E which latter may be conveniently shifted from the spindle C to the suspending member as is obvious. When the wheel has been removed from the spindle and positioned as above described, the spindle can be repaired or lubricated, likewise the wheel.

The foregoing description covers the use of the suspending member 9 when it is desired to simply remove the wheel E from its spindle C for the purpose of lubricating them or for the purpose of slightly repairing them. Should the vehicle wheel need more than a slight repair or should it be desired to paint the wheel the latter can be mounted upon the suspending member 9 with the box or enlarged portion of the hub in position to receive the bearing or boss 12 which extends from the collar 11. After this operation, the wheel and the suspending member can be readily transported to the trestle shown particularly in Figs. 5 and 6 of the drawings. The trestle consists of a base 14 which has mounted thereon supporting wheels 15. The base is provided with outer and inner standards 16 and 17 which are provided with bearing plates 18 in which are formed alining grooves 19. The outer standard 16 is somewhat shorter than the inner standard 17 but is otherwise identical in construction with the same, each being provided with a seat or crotch 20 and with an angularly disposed pin or stud 21. The seat or crotch 20 formed in the standard 17 is disposed at a higher elevation than the seat or crotch 20 formed in the standard 16. The pin or stud 21 upon the standard 17 is also disposed at a higher elevation than the pin or stud 21 upon the standard 16. The seats 20, likewise the pins 21 and the recesses 19 serve as steps, and in operatively positioning the wheel to be operated upon upon the trestle, the portion 22 of the suspending member is operated as a lever and is grasped in the hand of the operator. The opposite end of the said suspending member is first placed upon the pin 21 upon the standard 16 and is finally moved into the seats and recesses hereinbefore described, each being arranged to form a fulcrum and to support the entire weight of the wheel.

Upon reference to Fig. 6 it will be seen that a portion of the suspending member 9 forwardly of the collar 11 is mounted in the recess at the upper end of the innermost standard 17. A series of hooks or stops 23 extend from one side of the standard 6. After the portion of the suspending member forwardly of the collar 11 has been finally seated in the recess formed at the upper end of the standard 17, the portion 22 can be adjusted angularly so that the said member can be engaged with either of the hooks or stops 23 as shown in Fig. 6. This construction offers means whereby the wheel to be operated upon can be disposed at the angle to best suit the convenience of the painter or operator of the apparatus. When the trestle is placed in storage, the suspending member 9 may be engaged with eye member 24 carried by the standard 16.

I claim:

1. The combination with a support having a recessed portion, of a wheel-supporting member provided with a forked spindle-engaging portion and provided intermediate of its ends with a bearing which is removably mounted in the said recessed portion of the support, the said wheel-supporting member having a portion extended beyond the bearing to form an actuating handle.

2. The combination with a support having a plurality of standards which are each formed to provide a plurality of seats, the seats in one standard each being arranged in a different plane from the seats of the adjacent standard, a wheel-supporting member adapted to be interchangeably supported in the respective seats, at an angle to the horizontal, and means for holding the said support in its angular adjusted position.

3. In apparatus of the character described, the combination with a portable member having a plurality of support-standards affording a plurality of seats, a wheel-supporting member adapted to be interchangeably supported by the standards in different positions and superimposed hooks adapted to be engaged with one end of the said wheel-supporting member to hold the member in its adjusted position.

In testimony whereof I affix my signature in presence of two witnesses.

CHARLES H. GIVENS.

Witnesses:
H. M. DAVIS,
C. H. HOLDRIDGE.